Sept. 15, 1970     J. H. SCHMIDT ET AL     3,528,276
HOT-FORMING PRESS
Filed Jan. 26, 1968
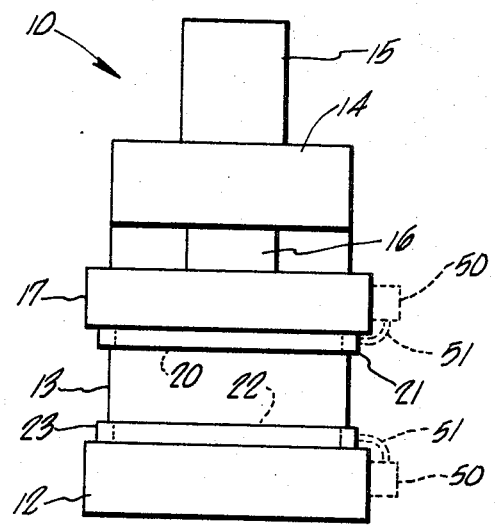
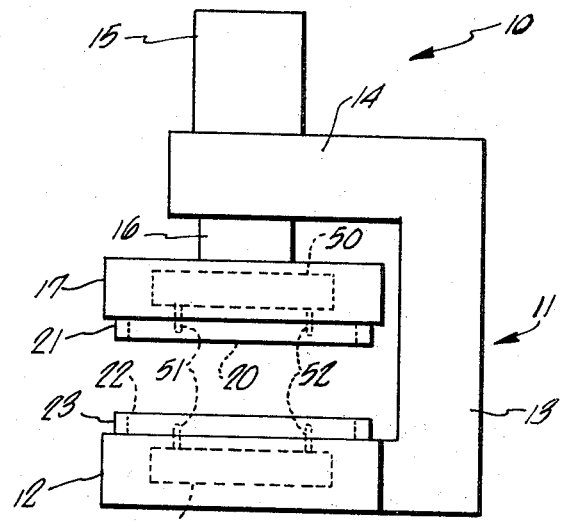
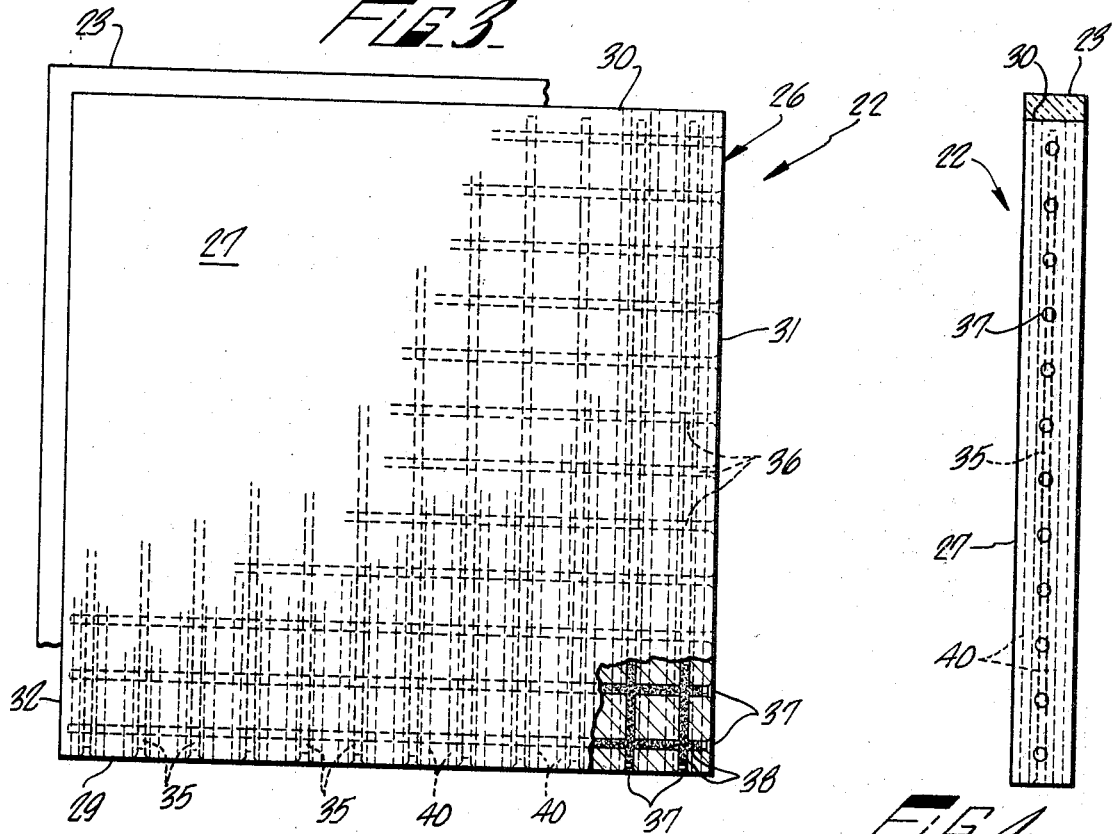
INVENTORS.
JAMES H. SCHMIDT
WARREN W. HEDSTROM
BY
Christie, Parker & Hale
ATTORNEYS

United States Patent Office 3,528,276
Patented Sept. 15, 1970

3,528,276
HOT-FORMING PRESS
James H. Schmidt, Berkeley, and Warren W. Hedstrom, Rolling Hills, Calif., assignors to Sheridan-Gray, Inc., Huntington Park, Calif., a corporation of California
Filed Jan. 26, 1968, Ser. No. 700,926
Int. Cl. B21d 37/16
U.S. Cl. 72—342                            11 Claims

ABSTRACT OF THE DISCLOSURE

An improved hot-forming press for forming and hot-sizing of metals such as titanium. The press operates at temperatures in the range of 1500° F., and includes a pair of platens which have internal sealed chambers in which bodies of a liquid metal (such as a sodium-potassium alloy) are disposed. The metal is in both liquid and vapor phases when the press is at a desired operating temperature. Electric heaters are provided for the platens, and the liquid metal circulates freely within each platen to equalize temperature non-uniformities in the platens.

BACKGROUND OF THE INVENTION

This invention relates to an improved high-temperature press suitable for use with titanium alloys, high-strength steels, and similar metals which are formed at elevated temperatures. Parts made of these materials find widespread application in high-speed aircraft and in other devices where strength must be maintained at elevated operating temperatures. Metals suitable for such applications, however, are characteristically difficult, expensive and time consuming to fabricate into complex shapes which are often required.

A technique known as "hot forming and sizing" has been developed in recent years for fabrication of parts made of these high-strength, lightweight materials. This technique involves clamping a blank or workpiece in a forming die or other fixture which in turn is mounted in a press to place the workpiece under mechanical stress. A strain or displacement is thereby induced in the workpiece.

The die and clamped workpiece are then heated to a temperature sufficient to reduce the strength and elastic limit of the workpiece material. The parameters of the process are controlled such that the stress in the heated workpiece exceeds the new elastic limit of the material. The result is a permanent deformation of the workpiece when it is cooled and removed from the die. The final shape of the resulting part is controlled by the initial shape of the workpiece, the stress and strain induced when the workpiece is clamped in the die, the temperature to which the workpiece is heated, and the time over which the workpiece is maintained at an elevated temperature.

This hot-sizing technique has been successfully used in the past with materials such as titanium alloys, and has many advantages over older conventional processes. It provides finished parts to close tolerances and at a reduced manufacturing cost. Heated presses are available for combined hot sizing and draw forming, and some of these presses are adapted to provide forming forces in several different planes. Details of the technique are known, and, for brevity, will not be further described.

Presses suitable for use in this technique typically have a pair of massive heated platens mounted in a frame. The platens have working surfaces which engage the die or other tooling, and are mounted to be movable toward and away from each other by a hydraulic cylinder or similar means. Gas or electrical heaters are used to elevate the temperature of both platens to a desired level which may be in excess of 1500° F.

A difficult problem in such presses is to maintain the working surfaces of the platens at a desired uniform temperature. Uneven temperatures across the platen surface are introduced by heat losses from the platen edges, an uneven supply of heat from discrete heat sources such as rod-shaped electrical heaters mounted on or within the platens, and localized heat flow from the platens into the die and workpiece. Uneven platen temperature interferes with optimum performance of the forming process, can cause distortion of tooling, and subjects the platen to severe stresses which can result in warping and reduced platen life.

In most applications, temperature equalization by heat conduction through a solid platen is too slow to avoid the aforementioned problems. Some known presses therefore employ multiple heaters which are arranged in separate zones on the platens. Heat sensors such as thermocouples are mounted in the several zones, and signals from these sensors are fed to separate control circuits which vary the amount of power fed to individual heaters.

This zone-control approach has met with some success, but is expensive and complex in view of the number of sensors and control circuits needed. In a typical press having a platen surface of about one square yard, nine separate zones are monitored and individually controlled on each platen. Even with this elaborate system, it has not been possible to reduce temperature nonuniformities below about ±250° F. at an operating temperature of 1500° F., and lower differentials are highly desirable for efficient distortion-free operation.

This invention solves the problem of temperature non-uniformity in a heated press platen, and is believed to be capable of providing simple and economical control of temperature within about ±5° F. at an operating temperature of about 1500° F. A metallic heat-transfer medium is disposed in a chamber within each platen, and the metallic liquid and its vapors flow freely to transfer heat from hot to cool areas on the platen. Uniform temperature is thereby achieved without zone control and the associated expensive and complex instrumentation. Chamber pressure is low at press operating temperatures, and a safe and reliable structure is thereby provided.

SUMMARY OF THE INVENTION

Briefly stated, this invention relates to an improved platen for a hot-forming press. The platen is a metal slab having a generally planar working surface adapted to contact a workpiece such as a die or part being formed. The slab has an internal chamber which is adjacent and generally contiguous with the working surface. A body of liquid metal such as a sodium-potassium alloy is disposed in the chamber. Sodium or potassium are also useful as liquid metals in the chamber.

Preferably, the chamber is evacuated prior to being backfilled with the liquid metal. After backfilling, the chamber is sealed from the surrounding atmosphere. In one form, the chamber is defined by a plurality of interconnected elongated linear bores extending into the slabs, the bores being oriented substantially parallel to the working surface. Plugs are welded in the ends of the bores to form the sealed chamber. A heating means such as a plurality of elongated resistance-heating rods are secured to the slab to raise the temperature of the slab to a desired operating level.

A pair of such platens are used in a hot-forming press formed according to the invention. The platens are secured in a mounting means such as a C-shaped frame, and a hydraulic cylinder on the frame is used to move the platens toward and away from each other to facilitate press loading and to force the platens against a die or other workpiece in the press.

BRIEF DESCRIPTION OF THE DRAWINGS

The invention will be described in detail with reference to the attached drawings, in which:

FIG. 1 is a front elevation of a hot-forming press having platens formed according to the invention;

FIG. 2 is a side elevation of the press;

FIG. 3 is a plan view, partly broken away, of a platen as used in the press shown in FIGS. 1 and 2;

FIG. 4 is a side view of the platen; and

FIG. 5 is a front view of the platen.

DESCRIPTION OF THE PREFERRED EMBODIMENTS

A hot-forming press 10 according to the invention is shown in FIGS. 1–2, and has a conventional C-shaped frame 11 with a base 12, an upright member 13 secured at its lower end to the base, and a horizontal member 14 secured to the upper end of member 13 and extending over base 12. A hydraulic cylinder 15 is secured to the horizontal member, and has a ram 16 extending below the horizontal member toward base 12. A generally rectangular upper-platen support 17 is secured to the end of the ram.

A generally rectangular slab-shaped upper platen 20 (shown in phantom in FIGS. 1–2) is rigidly secured to the undersurface of support 17. Side surfaces of the upper platen are covered by a body of insulating material 21 to minimize heat losses from these surfaces. A lower platen 22 (shown in phantom in FIGS. 1–2) is rigidly secured to the upper surface of base 12, and is generally similar in configuration to the upper platen. The sides of the lower platen are also covered by a body of insulating material 23 to minimize heat losses.

Press 10 is shown in semi-schematic form, and conventional operating controls, hydraulic-fluid supply lines, and the like are deleted for clarity. It is to be understood that such presses can be built in many different forms, and the illustrated unit is merely typical of available designs. For example, such presses can be provided with power-actuated mechanisms to move the platens away from each other in clamshell fashion to provide clear access to the working surface of the lower platen during press loading. Similarly, the press can be provided with a horizontally movable lower platen which can be moved laterally from beneath the upper platen to provide access for mounting of dies and fixtures, and for loading of parts to be formed.

The upper and lower platens are generally similar in construction, and lower platen 22 is shown in detail in FIGS. 3–5. Platent 22 is formed from a slab 26 of metal which maintains high strength and rigidity at elevated operating temperatures which may range to 1500° F. or above. 300-series stainless steels are suitable for this purpose, and known alloys sold under the trademarks "Incoloy," "Inconel" and "Hastelloy" are also useful as slab materials. Slab size varies according to individual press requirements, but a typical slab has a length and width of about three feet, and a thickness of about three and one-half inches.

Slab 26 has a generally planar upper working surface 27 which may include conventional keyways, threaded holes, or other apertures (not shown) to receive tooling, dies or other fixtures (not shown) used during press operation. A lower surface 28 of the slab is generally parallel to the working surface, and is adapted to be rigidly secured to base 12 of the press as shown in FIGS. 1–2. The periphery of the slab defines first, second, third and fourth side surfaces 29, 30, 31 and 32.

A first set of holes or bores 35 are formed in the slab by conventional boring techniques, and extend from first side surface 29 toward second side surface 30. The bores terminate slightly short of second side surface 30 such that only one end of the bore is open. The bores are generally parallel, laterally spaced apart, and typically have a diameter of about five-eighths inch. The open ends of the bores are chamfered to receive a sealing plug as described below.

A second set of bores 36 are formed in the slab to extend from third side surface 31 toward fourth side surface 32. Bores 36 terminate slightly short of side surface 32 such that only one end of each bore is open. This second set of bores is oriented at right angles to first bores 35, but are otherwise similarly formed in that they are generally parallel to each other, are laterally spaced apart, and typically have a diameter of about five-eighths inch. The two sets of bores are centrally spaced between working surface 27 and lower surface 28 of the slab, and the two sets of bores therefore intersect to form a grid-shaped labyrinth or chamber within the slab.

After the bores are formed and cleaned, a sealing plug 37 is welded in the open end of each of the bores except one. The chamber formed by the bores is then partially filled (to about 40%–50% of its volume) with a body of liquid metal 38, and next is evacuated by a conventional vacuum pump to remove air and other vapors in the chamber. Pressure in the chamber is preferably reduced to at least one millimeter of mercury during this pumping step. The remaining open bore is immediately sealed with a plug 37 to prevent reentry of air or other gases which could combine with vapors of the liquid metal to cause oxidation of the inner surfaces of the slab when the platen is heated. The presence of such gases could also undesirably insulate the walls of the cavity from efficient transfer of heat. All of the plugs are preferably welded in place to insure hermetic sealing of the chamber from the outside atmosphere surrounding the platen.

The platen is heated by a plurality of rod-shaped electrical-resistance-heating elements 40. The heaters are fitted in holes drilled through the slab from first side surface 29 to second side surface 30, and are disposed both above and below bores 35 and 36 which form the liquid-metal chamber. Rod-shaped heaters of this type are well known and commercially available, and, for brevity, will not be described in detail. The heaters are coupled by conventional means to a power source (not shown) adequate to provide sufficient electrical power to raise the temperature to a desired range of say 1500° F.

Liquid metal 38 is preferably a known sodium-potassium alloy generally designated by the pronounceable term NaK ("Nack"). An alloy consisting of 56% sodium and 44% potassium is preferred for use in the press platen, although other alloys of these materials can also be used. Preferably, the alloy contains 40% to 90% potassium, as this range of alloys is liquid at or near room temperature. A eutectic composition of NaK, for example, has 77.2% potassium, and a freezing point of about 10° F. A liquid state at room temperature is desirable as it simplifies backfilling of the internal chamber of the platen slab after the chamber is evacuated.

NaK is known to be a highly effective heat-transfer medium, and is characterized by rapid acceptance and delivery of heat energy. Nak has high thermal conductivity, a high heat of condensation, a high heat-transfer coefficient, and a density close to that of water. It has the further advantage of a vapor pressure of about one-atmosphere absolute at 1530° F., and little or no differential pressure therefore exists between the sealed chamber and the outside atmosphere when the platen is at an operating temperature of about 1500° F. Low chamber pressures are preferred to avoid the type of hazards present with a high-pressure heat-transfer medium (such as steam) in the event of accidental chamber rupture.

The invention is not limited to the use of NaK in the press platens, and other metals such as sodium or potassium may also be used. Sodium and potassium, however, have freezing points considerably in excess of the freezing point of NaK, and normally must therefore be placed in the platen chamber in solid form. These metals also have thermal properties which are not as close to optimum as the corresponding properties of NaK.

The selected metal preferably has a vapor pressure such that a substantial amount of the metal is in vapor form at the operating temperature of the press. It is desirable that the selected metal have a steep vapor pressure-temperature characteristic. These characteristics insure optimum heat transfer by the metal between regions of differing temperatures in the platen. The metal should also be selected for minimum platen-slab corrosion at elevated temperatures, and NaK is especially satisfactory from this standpoint. If the selected metal is solid at room temperature, it should of course be chosen such that it is substantially entirely in the liquid and vapor phases at the operating temperature of the press.

The use of liquid metals as heat-transfer agents has been extensively studied, and the characteristics of suitable materials including NaK are readily available in published literature. See, for example, the "Reactor Handbook—Engineering" published in 1955 by the United States Atomic Energy Commission. Another useful catalog of characteristics is the "Liquid-Metals Handbook" published in 1952 (with a NaK supplement in 1955) by the United States Atomic Energy Commission and the Department of the Navy.

In operation, press 10 is preheated by delivering electrical power to the heating elements in the upper and lower platens. Upper platen 20 is substantially identical in construction to lower platen 22, and need not be described in detail. When the platens are at operating temperature of say 1500° F. suitable for forming and hot-sizing of titanium alloys, the platen chambers contain NaK liquid and vapor at about one-atmosphere pressure.

A loaded die or other workpiece (not shown) is positioned on the lower platen, and hydraulic cylinder 15 is energized by conventional means (not shown) to urge the upper platen toward the lower platen against the workpiece. Temperature non-uniformities across the platen surface will occur at this point due to heating of the workpiece and for other reasons as discussed above. This uneven temperature distribution causes a natural circulation or convective movement of NaK liquid and vapor within the sealed platen chamber.

The circulation occurs because particles within a liquid or gas move with respect to each other if their pressures are different. That is, when two points of the platen are at different temperatures, the point of higher temperature produces a vapor pressure higher than that produced by the point of lower temperature. The resulting relative motion of the liquid or vapor particles results in a highly efficient heat-transfer mechanism as heat is carried from the hotter regions of the platen and released at the relatively cooler regions. Much of this heat is carried in vapor form, and at least part of the vapor may condense at the colder region to flow by gravity back toward an area of lower fluid level in the chamber.

The self-pumping action arising from the natural circulation of NaK liquid and vapor serves to equalize temperature differentials across the face of the platen, and it is believed that temperature non-uniformities can be maintained at less than ±5° F. at an operating temperature of 1500° F. Cancellation of temperature differentials is rapid due to the superior thermal properties of metals in liquid-vapor phases, and the pumping action is automatic and self-controlling without any need for multiple external temperature sensors and controllers as used on known presses. It is only necessary to provide a temperature sensor (such as a thermocouple) on each platen to provide a signal for controlling the amount of electrical power fed to the heating elements in the platens.

About thirteen cubic inches of NaK liquid metal (at room temperature) is useful to provide the desired heat transfer in a platen measuring about three feet by three feet by three and one-half inches as described above.

Normal operating precaution should be observed when handling the liquid metal, and contact with water should be avoided. The evacuation and backfilling steps should be carefully carried out according to known techniques to avoid the introduction of air or other vapors which could affect the heat-transfer characteristics of the system or combine with the liquid metal and its vapors to cause platen corrosion.

Although a closed-chamber configuration is preferred for operating simplicity, some applications may dictate the need for an external heater and boiler to pre-heat the liquid metal and circulate it through the platen. Such an arrangement is shown in phantom line in FIGS. 1–2, and includes external boilers 50 secured to the sides of upper-platen support 17 and base 12, and having inlet and outlet lines 51 and 52 in communication with the platen chambers. Heat energy supplied by the platen heating elements is thus supplemented by the heat externally supplied to the liquid metal in the boiler. The upper boiler is preferably mounted on the upper-platen support to move with the upper platen such that flexing of liquid-metal conduits or lines is avoided.

There has been described a novel hot-forming press having platens with internal chambers containing a metal in liquid-vapor phases as a heat-transfer medium. This system avoids the use of a large number of temperature sensors and controllers as required on existing presses, and provides superior heat distribution and elimination of temperature differentials within the platen. Furthermore, the full heat capacity of the platen is made available to correct temperature differentials, and the slow response of a zone-heating system is avoided.

While the press has been described in a presently preferred form using NaK liquid metal as a heat-transfer medium, other liquid metals and variations in platen and chamber configuration will suggest themselves to those skilled in the art. All such variations and modifications are intended to be within the scope of the invention as defined by the following claims.

We claim:

1. A platen for a hot-forming press, comprising:
   a slab having a generally planar working surface adapted to contact a workpiece, the slab having an internal chamber which is adjacent and generally contiguous with the working surface; and
   a body of a liquid metal disposed in and only partially filling the chamber to provide a space in the chamber for circulation of a vapor phase of the liquid metal when the platen is heated, whereby a substantially uniform temperature is maintainable across the slab working surface.

2. The platen defined in claim 1 in which the liquid metal is selected from the group consisting of sodium, potassium, and sodium-potassium alloys.

3. The platen defined in claim 2 in which the chamber is sealed from an atmosphere around the platen.

4. The platen defined in claim 1 in which the chamber is defined by a plurality of interconnected elongated linear bores extending into the slab, the bores being oriented substantially parallel to the working surface.

5. The platen defined in claim 4 and in which each bore is formed to extend from a side surface of the slab toward an opposing side surface, and further comprising a plurality of plugs secured to the slab in the bores to form a sealed chamber which confines the liquid metal within the slab.

6. The platen defined in claim 5 in which the liquid metal is a sodium-potassium alloy.

7. The platen defined in claim 6, and further comprising a plurality of elongated resistance-heating rods secured to the slab.

8. An improved hot-forming press comprising a pair of rigid press platens, each platen having a chamber;
   a body of liquid metal disposed in and only partially filling each of the platen chambers to provide a space in each chamber for circulation of a vapor phase of the liquid metal when the platens are heated;

heating means for heating the platens; and mounting means secured to the platens and adapted to move the platens toward and away from each other.

9. The press defined in claim 8 in which the liquid metal is selected from the group consisting of sodium, potassium, and sodium-potassium alloys.

10. The press defined in claim 8 in which the liquid metal is a sodium-potassium alloy.

11. The press defined in claim 10 in which the chambers are sealed from an atmosphere around the platens, and the heating means is adapted to heat the platens to approximately 1500° F.

References Cited

UNITED STATES PATENTS 2,627,628    2/1953    Pare _____ 72—342

LOWELL A. LARSON, Primary Examiner

PO-1050
(5/69)

UNITED STATES PATENT OFFICE
CERTIFICATE OF CORRECTION

Patent No. 3,528,276      Dated September 15, 1970

Inventor(s) James H. Schmidt et al.

It is certified that error appears in the above-identified patent and that said Letters Patent are hereby corrected as shown below:

Column 2, line 30, "250°" should read --25°--.
Column 3, line 53, "Platent" should read --Platen--.

SIGNED AND
SEALED
DEC 22 1970

(SEAL)
Attest:

Edward M. Fletcher, Jr.
Attesting Officer

WILLIAM E. SCHUYLER, JR.
Commissioner of Patents